July 27, 1948.  E. J. LUNNEY  2,445,792
INSTRUMENT FOR MEASURING THE SLOPES OF A CURVE
Filed June 12, 1946  2 Sheets-Sheet 1
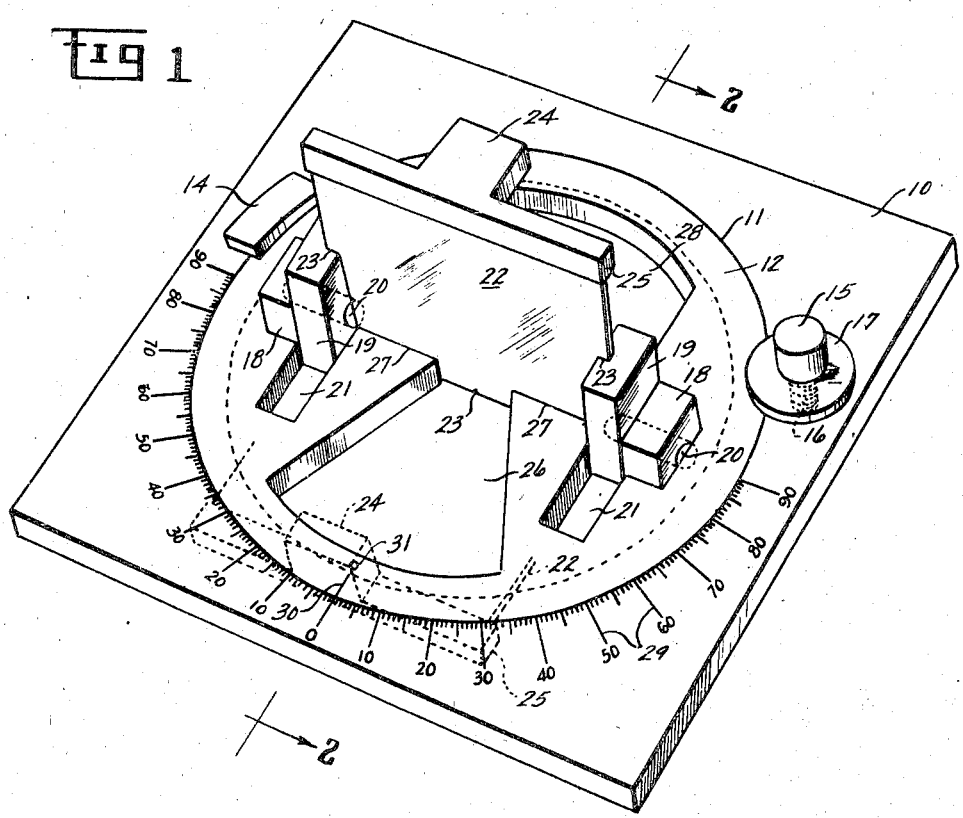
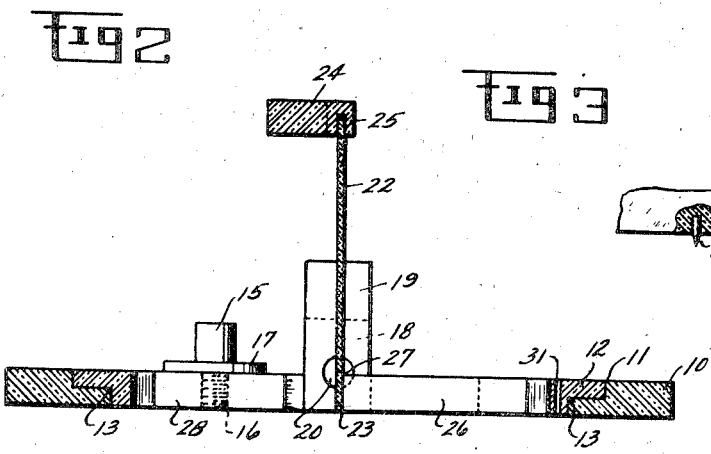
INVENTOR.
EDWARD J. LUNNEY
BY
HIS ATTORNEYS July 27, 1948.  E. J. LUNNEY  2,445,792
INSTRUMENT FOR MEASURING THE SLOPES OF A CURVE
Filed June 12, 1946  2 Sheets-Sheet 2
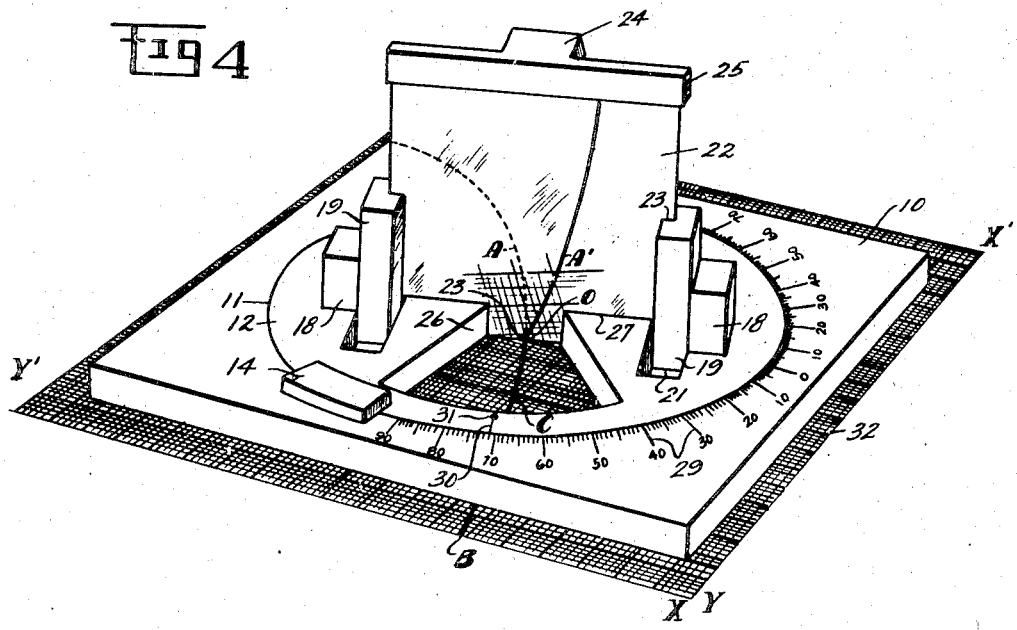
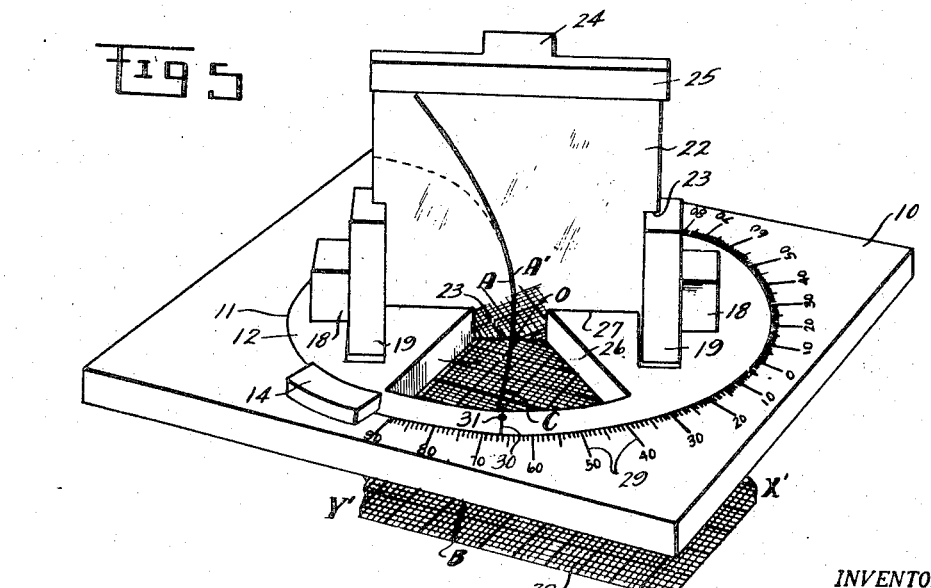
INVENTOR.
EDWARD J. LUNNEY
BY
HIS ATTORNEYS Patented July 27, 1948

2,445,792

UNITED STATES PATENT OFFICE 2,445,792

INSTRUMENT FOR MEASURING THE SLOPES OF A CURVE

Edward J. Lunney, Dayton, Ohio

Application June 12, 1946, Serial No. 676,127

5 Claims. (Cl. 88—74)

(Granted under the act of March 3, 1883, as amended April 30, 1928; 370 O. G. 757)

The invention described herein may be manufactured and used by or for the Government for governmental purposes without payment to me of any royalty thereon.

This invention relates to an improved instrument for measuring the slope of a curve at any point thereon.

In the past, this operation was done by many time consuming and inaccurate methods, among which was to draw a circle fitting the slope, drawing a tangent to the circle along the curve and then measuring the divergence of the tangent from a vertical reference line. One device for curve slope measurement is the subject of Patent 1,907,873 to Richards and Roope. It is upon devices of this sort that the present invention is an improvement in that it is faster, just as accurate and much more convenient.

Referring now to the drawings:

Fig. 1 is a perspective view of the device.

Fig. 2 is a sectional elevation taken on the line 2—2 of Fig. 1.

Fig. 3 is a fragmentary detail in elevation of a pin which may be provided to center the device.

Fig. 4 is a perspective view of the device in use in determining the slope of a curve drawn on graph paper. Alignment has not yet been accomplished.

Fig. 5 is a perspective view corresponding to Fig. 4 with the difference that alignment of the curve with its reflection has been performed.

In the drawings 10 is an outer base, the general shape of which is preferably square, although it may be made circular or octagonal. In the center of base 10, there is a large circular opening 11 into which rotatably fits an inner base 12. An L-shaped overlapping joint 13, shown in Fig. 2 is used to provide an easy but accurate fit. Transparent thick plastic is the preferred material.

Two devices are used to prevent the inner base 12 from separating from the outer one 10. The first device 14 is a small plastic block cemented to the upper surface of base 10 so that the block extends over the inner base 12 but is not cemented thereto. The second device is a screw lock 15 which comprises a thumbscrew 16 threadedly engaging the base 10 near the outer edge of joint 13. A disc 17 of plastic which has been relieved on its inner surface, is held by screw 16 to the face of base 10 and partially over base 12 so that when screw 16 is tightened, base 12 cannot be rotated except with difficulty. The setting of the two bases in relation to each other is thereby preserved.

Across the diameter of inner base 12 there are mounted a pair of hinge blocks 18 in which are pivoted a second pair of hinge blocks 19 by means of pins 20. Slots 21 are provided in base 12 to receive blocks 19 upon their rotation.

A transparent mirror 22, preferably a "dark" mirror, is mounted in grooves 23 so that when blocks 19 and mirror 22 are upright, the lower edge of the mirror will be in the plane of the bottoms of bases 10 and 12. A small dot 23 is made by scratching a little of the reflecting substance from the middle point of the lower edge of the mirror so that the dot may serve as a fiducial point. As such, it defines the center of bases 10 and 12 and is the center of rotation of base 12. A tab 24 and guard 25 protect the top edge of mirror 22 and provide a finger grip for raising it to its upright position or for lowering it to a horizontal position as shown in dotted lines in Fig. 1.

A generally keystone-shaped opening 26 is provided in the inner base, the shoulders 27 of which provide a stop which holds mirror 22 in an exactly vertical position with reference to the bases. The opening also provides observation of the curve to be measured. Such observation is both direct and indirect, i. e., part of the curve is observed as a reflection in the mirror. A second opening 28 is shown, the purpose of which is to provide space to swing the mirror about pins 20 and also for observation of curves from the reverse side of the mirror. For the measurement of slope, a scale 29 divided in minutes of angle is provided on the inner edge of base 10 and a reference line 30 placed radially on inner base 12 to reach the scale.

Instead of a dot 23 at the bottom of mirror 22, a pin 33 may be provided (see Fig. 3). More convenience is achieved by the use of a pin, since the inner base 12 with the mirror 22 can then readily be rotated with pin 33 as axis.

For convenience in carrying the instrument, the mirror may be folded down to a position shown in dotted lines on Fig. 1.

The instrument is used as follows:

To measure the slope of the curve AOCB at the point O, the instrument is placed on the paper 32 with the inner base 12 free to rotate. The index pin 33 is placed directly on point O. The outer base 10 is then rotated until its outer edges are each parallel respectively to the XX' and YY' axes on the graph paper 32 on which the curve is drawn. The operator then looks through the mirror 22 as shown in Fig. 4 and sees the branch AO of the actual curve AOCB and also the reflected image OA' of the section OC of the actual curve.

With the base 10 still aligned with the X and

Y axes, the inner base 12 and the mirror 22 are rotated until the images AO and AO' are superposed for a considerable portion of their length (see Fig. 5). The mirror 22 is now perpendicular to the tangent of the curve at O and the index mark 30 and the scale 20 may be read to determine the slope of the curve with respect to the base line. A vernier may be added to provide more accurate readings.

In the event that it is desired to draw the actual tangent to the curve at O, a second point on the tangent may be located by spotting through a small hole 21 through the inner base 12 at the index line 30 with a pin or sharp-pointed pencil.

The remaining space on the meeting edges of outer base 10 and inner base 12 not occupied by the degree scale may be used to bear a scale graduated in numerical values of the tangent function.

In an instrument of this character in which the circular scales are dispensed with, the slope of the curve at O may be evaluated from the slope of a line Z (not shown) in respect to the base line XX' coordinate axis of the curve in the following manner:

A straight edge is placed against the edge of the base of the instrument to allow displacement of the instrument always parallel to its former position, the instrument being moved in this way until a convenient intersection of a fiducial line M (not shown) with the graph lines is found so that a segment of the fiducial line will form the hypotenuse of a right triangle of which one vertical and one horizontal graph line are the remaining two sides. The line M is derived from a line drawn on the base of the instrument from the mirror 22 to the outer edge of the base and is perpendicular to both the mirror and said outer edge. It is tangent to the reflected projection A'O.

The slope of the section of the fiducial line M may then be determined by counting the unit graph lines to determine the tangent as a ratio of the side opposite to the side adjacent the angle that the section of line M makes with base line XX'.

Certain omissions may be made in the structure shown. The base may be simplified so that only the inner base remains and that need not be circular. It need have only the cut out portion 26 and a vertical block such as 19 for holding the mirror 22 vertical. Block 19 need not be movable, i. e., the mirror can be permanently erect.

The invention claimed is:

1. In a geometrical instrument, an outer base, a circular inner base rotatably mounted therein, indicia on the meeting edges of said bases for ascertaining their relative positions, a transparent mirror mounted vertically within the inner base on a diameter thereof, said inner base having an opening which extends before and behind said mirror whereby curves drawn on paper lying flat below said opening and running toward the mirror upon the surface of said paper upon which the instrument is laid to rest on its bases will appear to be continued in said mirror whereby the reflection of a curve drawn upon a paper surface upon which the instrument rests may be aligned by rotating the inner base and mirror with the actual prolongation of said curve observed directly through the mirror to obtain an indication from the position of said mirror and inner base with respect to the outer base, of the slope of the tangent to the curve.

2. In a geometrical instrument, an outer base, an inner base rotatably mounted therein, indicia on the meeting edges of said bases for ascertaining their relative positions, a transparent mirror mounted erectably within the inner base on a diameter thereof, said inner base having before and behind said mirror an opening of substantial length and breadth in said inner base whereby a curve drawn upon coordinate paper lying flat beneath said opening, said curve running to said mirror below said openings when the instrument is laid to rest upright on its bases will appear to be continued in said mirror and may be aligned with its reflection therein and its directly-observed actual prolongation, whereby the angular position of said mirror and inner base with respect to the outer base will indicate the slope of the tangent to the curve with respect to the reference axes of the curve.

3. A geometrical instrument according to claim 2 having in addition hinged blocks between which said mirror is pivoted and shoulders in the inner base against which the mirror abuts when erected, said shoulders being adapted to align said mirror vertically.

4. A geometrical instrument comprising a base, a transparent mirror mounted vertically in said base, a pin extending outwardly from the lower edge of said mirror at the middle point thereof and extending down substantially to the surface upon which the instrument rests said base having a cutout portion before said mirror, whereby a curve drawn on a surface upon which the instrument rests upon its base may be aligned to continue through the point defined by said pin with its reflection in said mirror and the real prolongation of the curve simultaneously observed through said mirror upon rotation of the instrument.

5. A geometrical instrument adapted to determine the slope of a curve at any point thereon which comprises a square outer base, a circular inner base rotatably mounted therein upon a stepped joint, indicia at the meeting edges of the two bases whereby their relative angular positions may be determined, a transparent mirror erectably mounted on a diameter of said inner base, pivot blocks in which said mirror is pivotally mounted so as to be foldable downward and vertically alignable, said inner base having a keystone shaped opening in front of said mirror when the latter is erected and a U-shaped opening behind it, a pair of aligning shoulders for said mirror to hold the mirror in erect alignment, said shoulders being between said openings, and means for retaining said inner base in said outer one and for locking said inner base against rotation.

EDWARD J. LUNNEY.

REFERENCES CITED

The following references are of record in the file of this patent:

UNITED STATES PATENTS

| Number | Name | Date |
|---|---|---|
| 781,117 | Willitts | Jan. 31, 1905 |
| 1,212,938 | Grubman | Jan. 16, 1917 |
| 1,907,873 | Richards et al. | May 9, 1933 |

FOREIGN PATENTS

| Number | Country | Date |
|---|---|---|
| 238,499 | Germany | Sept. 26, 1911 |
| 545,262 | Great Britain | May 18, 1942 |